(12) United States Patent
Abusleme et al.

(10) Patent No.: US 12,489,106 B2
(45) Date of Patent: Dec. 2, 2025

(54) METHOD FOR THE MANUFACTURE OF ELECTRODES

(71) Applicants: SYENSQO SA, Brussels (BE); POLITECNICO DI TORINO, Turin (IT)

(72) Inventors: Julio A. Abusleme, Saronno (IT); Maurizio Biso, Milan (IT); Alberto Frache, Alessandria (IT); Daniele Battegazzore, Alessandria (IT); Francesco Liberale, Pavia (IT)

(73) Assignees: SYENSQO SA, Brussels (BE); POLITECNICO DI TORINO, Turin (IT)

( * ) Notice: Subject to any disclaimer, the term of this patent is extended or adjusted under 35 U.S.C. 154(b) by 732 days.

(21) Appl. No.: 17/601,724

(22) PCT Filed: Apr. 29, 2020

(86) PCT No.: PCT/EP2020/061825
§ 371 (c)(1),
(2) Date: Oct. 6, 2021

(87) PCT Pub. No.: WO2020/225041
PCT Pub. Date: Nov. 12, 2020

(65) Prior Publication Data
US 2022/0173379 A1    Jun. 2, 2022

(30) Foreign Application Priority Data

May 3, 2019 (EP) .................................. 19172469
Feb. 3, 2020 (EP) .................................. 20155055

(51) Int. Cl.
| | | |
|---|---|---|
| *H01M 4/1393* | (2010.01) | |
| *H01M 4/62* | (2006.01) | |
| *H01M 10/0525* | (2010.01) | |
| H01M 4/02 | (2006.01) | |

(52) U.S. Cl.
CPC ......... *H01M 4/1393* (2013.01); *H01M 4/623* (2013.01); *H01M 4/625* (2013.01); *H01M 10/0525* (2013.01); H01M 2004/027 (2013.01); H01M 2004/028 (2013.01)

(58) Field of Classification Search
CPC ............................ H01M 4/1393; H01M 4/623
See application file for complete search history.

(56) References Cited

U.S. PATENT DOCUMENTS

| | | |
|---|---|---|
| 2003/0054245 A1 | 3/2003 | Barton et al. |
| 2005/0032968 A1* | 2/2005 | Drujon ................. C09D 127/16 524/515 |
| 2010/0133482 A1* | 6/2010 | Abusleme .............. B01D 71/76 252/511 |
| 2017/0077505 A1 | 3/2017 | Pras et al. |

FOREIGN PATENT DOCUMENTS

| | | |
|---|---|---|
| WO | 2008129041 A1 | 10/2008 |
| WO | 2017216179 A1 | 12/2017 |
| WO | 2018050314 A1 | 3/2018 |
| WO | 2018114753 A1 | 6/2018 |

\* cited by examiner

*Primary Examiner* — Jonathan G Jelsma
(74) *Attorney, Agent, or Firm* — Osha Bergman Watanabe & Burton LLP

(57) ABSTRACT

The present invention pertains to an electrode-forming composition, to use of said electrode-forming composition in a process for the manufacture of an electrode, to said electrode and to an electrochemical device comprising said electrode.

15 Claims, No Drawings

METHOD FOR THE MANUFACTURE OF ELECTRODES

CROSS-REFERENCE TO RELATED APPLICATIONS

This application is a U.S. national stage entry under 35 U.S.C. § 371 of International Application No. PCT/EP2020/061825 filed Apr. 29, 2020, which claims priority to European application No. 19172469.9 filed on May 3, 2019 and to European application No. 20155055.5 filed on Feb. 3, 2020. The entire contents of these applications are explicitly incorporated herein by this reference.

TECHNICAL FIELD

The present invention pertains to an electrode-forming composition, to use of said electrode-forming composition in a process for the manufacture of an electrode, to said electrode and to an electrochemical device comprising said electrode.

BACKGROUND ART

To date, techniques for manufacturing either positive or negative electrodes involve the use of organic solvents such as N-methyl-2-pyrrolidone (also referred to as "NMP") for dissolving fluoropolymer binders and homogenizing them with an electro-active material and all other suitable components to produce a paste to be applied to a metal collector.

The role of the organic solvent is typically to dissolve the fluoropolymer in order to bind the electro-active material particles to each other and to the metal collector upon evaporation of the organic solvent. The polymer binder should properly bind the electro-active material particles together and to the metal collector so that these particles can chemically withstand large volume expansion and contraction during charging and discharging cycles.

Although NMP is a solvent widely used for dissolving fluoropolymers, because of its costs and environmental concerns, this solvent is recycled. However, the use of NMP is raising issues from both human health and environmental impact perspective.

Therefore, recently the need was felt for alternative processes for the manufacture of electrodes in the absence of solvents.

For example, WO 2018/050314 (in the name of Robert Bosch GmbH) discloses a method for producing an electrode film, wherein a particle mixture is produced from particles of a polymer binder and conductive carbon black by premixing, then agglomerates are produced by compacting said particles and, after addition of an electrochemical active material, the electrode film is manufactured by rolling or extrusion. Thus, this patent application described a process wherein solid particles are mixed, then compacted into agglomerates, which are then reduced in size and sieved, before rolling or extruding said solid mixture. While in the description a solvent is said that may be added, there is no example (nor reference in the accompanying figures) of a process wherein the mixture to be processed is liquid. Indeed, the entire description and the figures referred to a process wherein a solid mixture is used.

SUMMARY OF INVENTION

The Applicant perceived that the need still exists for a process for the manufacture of electrodes, wherein no solvent (like NMP) is used to dissolve the fluoropolymer and hence no recycle is needed.

The Applicant surprisingly found that the above technical problem can be solved by using the composition in the process according to the present invention.

Indeed, the Applicant surprisingly found that by melt extruding the composition of the invention, it is possible to manufacture electrodes suitable for use in electrochemical devices.

Thus, in a first aspect, the present invention relates to a composition [composition (C)] comprising:
- from 0.5 wt. % to less than 20 wt. %, preferably to less than 15 wt. % of at least one semi-crystalline partially fluorinated polymer [polymer (F)] comprising recurring units derived from 1,1-difluoroethylene (VDF);
- from 10 wt. % to less than 60 wt. %, preferably to less than 41 wt. %, of at least one liquid medium [medium (L)] characterized by a boiling point equal to or higher than 150° C.; and
- at least 50 wt. % of at least one electro-active compound [compound (EA)];

wherein the above amounts are based on the total weight of said composition (C).

In a second aspect, the present invention pertains to the use of said composition (C) in a process for the manufacture of an assembly, more preferably an electrode [electrode (E)].

In a third aspect, the present invention relates to a process for the manufacture of an assembly, said process comprising:
(i) providing a substrate;
(ii) providing composition (C) as defined above;
(iii) heating said composition (C) at a temperature higher than 100° C.;
(iv) extruding the composition (C) provided in step (ii) onto the substrate provided in step (i), thereby providing an assembly comprising a substrate coated with at least one layer consisting of said composition (C).

In a fourth aspect, the present invention relates to an assembly obtained with the above-mentioned process.

Advantageously, said assembly comprises:
- at least one substrate, and
- directly adhered onto said substrate, at least one layer [layer (L1)] consisting of a composition [composition (C2)] comprising:
- at least one polymer (F) as defined above,
- at least one compound (EA) as defined above,
- at least one liquid medium [medium (L)] as defined above.

Advantageously, said assembly is an electrode [electrode (E)]. More preferably, said electrode (E) is a cathode or an anode.

The electrode (E) of the invention is particularly suitable for use in electrochemical devices.

Non-limiting examples of suitable electrochemical devices include secondary batteries, preferably an alkaline or an alkaline-earth secondary battery. More preferably, said secondary battery is a lithium-ion secondary battery.

DESCRIPTION OF EMBODIMENTS

As used within the present description and in the following claims:
- the use of parentheses around symbols or numbers identifying the formulae, for example in expressions like "polymer (P)", etc., has the mere purpose of better distinguishing the symbol or number from the rest of the text and, hence, said parenthesis can also be omitted;

the terms "1,1-difluoroethylene", "1,1-difluoroethene" and "vinylidene fluoride" are used as synonyms;

the terms "poly-(1,1-difluoroethylene)" and "polyvinylidene fluoride" are used as synonyms;

the term "secondary battery" is intended to denote a rechargeable battery;

the term "electro-active compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release lithium ions;

the expression "partially fluorinated polymer" is intended to denote a polymer comprising recurring units derived from at least one fluorinated monomer and, optionally, at least one hydrogenated monomer, wherein at least one of said fluorinated monomer and said hydrogenated monomer comprises at least one hydrogen atom;

the term "fluorinated monomer" is intended to denote an ethylenically unsaturated monomer comprising at least one fluorine atom;

the term "hydrogenated monomer" is intended to denote an ethylenically unsaturated monomer comprising at least one hydrogen atom and free from fluorine atoms;

the expression "at least one fluorinated monomer" is intended to indicate that the polymer may comprise recurring units derived from one or more than one fluorinated monomers;

the expression "fluorinated monomers" is intended both in the plural and the singular, that is to say that they denote both one or more than one fluorinated monomers as defined above;

the expression "at least one hydrogenated monomer" is intended to indicate recurring units derived from one or more than one hydrogenated monomers;

the expression "hydrogenated monomers" is intended both in the plural and the singular, that is to say that they denote both one or more than one hydrogenated monomers as defined above.

The term "semi-crystalline" is hereby intended to denote a polymer (F) having a heat of fusion of from 5 to 90 J/g, preferably of from 30 to 60 J/g, as measured according to ASTM D3418-08.

Advantageously, said polymer (F) is characterized by an intrinsic viscosity higher than 0.05 L/g, more preferably higher than 0.12 L/g and even more preferably higher than 0.25 L/g, the intrinsic viscosity being measured as the dropping time of a solution of said polymer (F1) at 25° C. at a concentration of 0.2 g/dL in N.N-dimethylformamide using a Ubbelhode viscosimeter, as detailed in the Experimental Section.

Preferably, said polymer (F) comprising recurring units derived from 1,1-difluoroethylene (VDF) and recurring units derived from at least one hydrogenated monomer comprising at least one carboxylic acid end group [monomer (MA)] and/or recurring units derived from at least one partially or fully fluorinated monomer [monomer ($F_{FH}$)], said monomer ($F_{FH}$) being different from VDF.

According to a preferred embodiment, said polymer (F) comprises, more preferably consists of:
(I) recurring units derived from VDF and
(II) recurring units derived from at least one monomer (MA).

Polymer (F) according to this embodiment will be herein after referred to as "polymer (F*)".

Preferably, said polymer (F*) comprises, more preferably consists of:
at least 90% by moles, preferably at least 95% by moles, more preferably at least 97% by moles of recurring units derived from VDF,
from 0.05% to 10% by moles, preferably from 0.1% to 5% by moles, more preferably from 0.2% to 3% by moles of recurring units derived from at least one monomer (MA).

According to a preferred embodiment, said polymer (F) comprises, more preferably consists of:
(I) recurring units derived from VDF,
(II) recurring units derived from at least one monomer (MA) and
(III) recurring units derived from at least one monomer ($F_{FH}$).

Polymer (F) according to this embodiment will be herein after referred to as "polymer (F**)".

Preferably, said polymer (F**) comprises, more preferably consists of:
at least 80% by moles, preferably at least 85% by moles, more preferably at least 90% by moles of recurring units derived from VDF,
from 0.01% to 10% by moles, preferably from 0.05% to 5% by moles, more preferably from 0.1% to 1.5% by moles of recurring units derived from at least one monomer (MA), and
from 0.1% to 15% by moles, preferably from 0.5% to 12% by moles, more preferably from 1% to 10% by moles of at least one monomer ($F_{FH}$).

In a particularly preferred embodiment of the present invention, said polymer (F) is polymer (F-1), which comprises, more preferably consists of:
at least 80% by moles, preferably at least 85% by moles, more preferably at least 90% by moles of recurring units derived from VDF,
from 0.01% to 10% by moles, preferably from 0.05% to 5% by moles, more preferably from 0.1% to 1.5% by moles of recurring units derived from at least one monomer (MA), and
from 5% to 12% by moles, more preferably from 6% to 10% by moles of at least one monomer (FFH).

The polymer (F**) may be obtained by polymerization of a VDF monomer, at least one monomer (MA) and at least one monomer (FFH) according to the teaching, for example, of WO 2008/129041.

Advantageously, said polymer (F*) and said polymer (F**) are characterized by an intrinsic viscosity higher than 0.25 L/g and lower than 0.60 L/g, the intrinsic viscosity being measured as the dropping time of a solution of said polymer (F*) or (F**) at 25° C. at a concentration of 0.2 g/dL in N.N-dimethylformamide using a Ubbelhode viscosimeter, as detailed in the Experimental Section.

According to a preferred embodiment, said polymer (F) comprises, preferably consists of:
(I) recurring units derived from VDF, and
(II) recurring units derived from at least one monomer ($F_{FH}$).

Polymer (F) according to this embodiment will be herein after referred to as "polymer (F^)".

More preferably, said polymer (F^) comprises:
at least 80% by moles, preferably at least 85% by moles, more preferably at least 90% by moles of recurring units derived from VDF, and
from 0.1% to 15% by moles, preferably from 0.5% to 12% by moles, more preferably from 1% to 10% by moles of at least one monomer ($F_{FH}$).

Advantageously, said polymer (F^) is characterized by an intrinsic viscosity higher than 0.05 L/g and lower than 0.60 L/g, more preferably lower than 0.25 L/g, the intrinsic viscosity being measured as the dropping time of a solution of said polymer (F^) at 25° C. at a concentration of 0.2 g/dL in N.N-dimethylformamide using a Ubbelhode viscosimeter, as detailed in the Experimental Section.

Determination of average mole percentage of recurring units derived from at least one monomer (MA) in the polymer (F) can be performed by any suitable method. Mention can be notably made of acid-base titration methods, well suited e.g. for the determination of the acrylic acid content, of NMR methods, adequate for the quantification of monomers (MA) comprising aliphatic hydrogen atoms in side chains, of weight balance based on total fed monomer (MA) and unreacted residual monomer (MA) during polymer (F) manufacture.

Advantageously, said monomer (MA) complies with the following chemical formula:

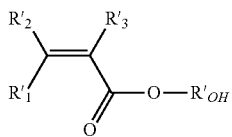

(II)

wherein:

$R'_1$, $R'_2$ and $R'_3$ are hydrogen atoms, and $R'_{OH}$ is a hydrogen atom or a $C_1$-$C_5$ hydrocarbon moiety comprising at least one hydroxyl group.

Non-limiting examples of said monomer (MA) are, notably, acrylic acid, methacrylic acid, hydroxyethylmethacrylate, hydroxyethylacrylate, hydroxypropylmethacrylate, hydroxypropylacrylate, hydroxyethylhexyl methacrylate, hydroxyethylhexylacrylate, and mixtures thereof.

Preferably, said monomer (MA) is selected from the group comprising, more preferably consisting of:

hydroxyethyl acrylate (HEA) of formula:

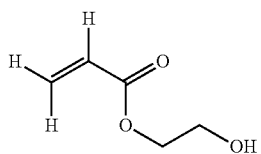

2-hydroxypropyl acrylate (HPA) of either of formulae:

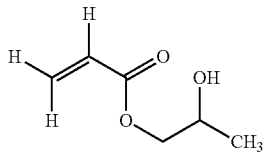 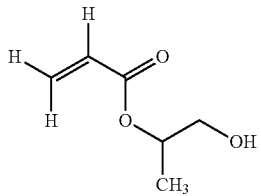

acrylic acid (AA) of formula:

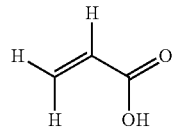

and mixtures thereof.

According to a preferred embodiment, said monomer (MA) is acrylic acid (AA).

Preferably, said monomer ($F_{FH}$) is selected in the group comprising, more preferably consisting of:

$C_2$-$C_8$ perfluoroolefins, such as tetrafluoroethylene (TFE) and hexafluoropropylene (HFP);

$C_2$-$C_8$ hydrogenated fluoroolefins different from VDF, such as vinyl fluoride, 1,2-difluoroethylene and trifluoroethylene;

$CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins, such as chlorotrifluoroethylene (CTFE);

$CF_2=CFOX_0$ wherein $X_0$ is a $C_1$-$C_6$ fluoro- or perfluoroalkyl, e.g. $CF_3$, $C_2F_5$, $C_3F_7$; a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group; group $-CF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;

$CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

More preferably, said monomer ($F_{FH}$) is selected in the group comprising, preferably consisting of: vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

Polymer (F) is typically obtainable by emulsion polymerization or suspension polymerization according to the methods known to the skilled person in this field.

The nature of the compound (EA) in composition (C) and as a consequence in layer (L1) of the assembly of the invention, depends on whether the final assembly thereby provided is a positive electrode [electrode (Ep)] or a negative electrode [electrode (En)].

In the case of forming a positive electrode for a lithium-ion secondary battery, said compound (EA) may comprise a composite metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ ($0<x<1$) and spinel-structured $LiMn_2O_4$.

As an alternative, still in the case of forming a positive electrode for a lithium-ion secondary battery, the compound (EA) may comprise a lithiated or partially lithiated transition metal oxyanion-based electro-active material of formula $M_1M_2(JO_4)_fE_{1-f}$ wherein $M_1$ is lithium, which may be partially substituted by another alkali metal representing less that 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (EA) has formula $Li_{3-x}M'_yM''_{2-y}(JO_4)_3$ wherein 0≤x≤3, 0≤y≤2, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein 0≤x≤1, wherein x is preferably 1 (that is to say, lithium iron phosphate of formula $LiFePO_4$).

Preferably, said compound (EA) is selected from lithium-containing complex metal oxides of general formula (I)

$$LiNi_xM^1_yM^2_zY_2 \qquad (I)$$

wherein $M^1$ and $M^2$ are the same or different from each other and are transition metals selected from Co, Fe, Mn, Cr and V, 0.5≤x≤1, wherein y+z=1−x, and Y denotes a chalcogen, preferably selected from O and S.

The positive electrode active material (AM) is preferably a compound of formula (I) wherein Y is O.

In a preferred embodiment, $M^1$ is Mn and $M^2$ is Co.

In another preferred embodiment, $M^1$ is Co and $M^2$ is Al.

Examples of such active materials include $LiNi_xMn_yCo_zO_2$, herein after referred to as NMC, and $LiNi_xCo_yAl_zO_2$, herein after referred to as NCA.

Specifically with respect to $LiNi_xMn_yCo_zO_2$, varying the content ratio of manganese, nickel, and cobalt can tune the power and energy performance of a battery.

In a preferred embodiment of the present invention, the active material (AM) is a compound of formula (I) as above defined, wherein 0.5≤x≤1, 0.1≤y≤0.5, and 0≤z≤0.5.

Non limitative examples of suitable positive electrode active materials (AM) of formula (I) include, notably:

$LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiNi_{0.8}Co_{0.15}Al_{0.05}O_2$, and $LiNi_{0.8}Co_{0.2}O$.

Active materials (AM) which have been found particularly advantageous are $LiNi_{0.8}Co_{0.15}Al_{0.05}O_2$, $LiNi_{0.6}Mn_{0.2}Co_{0.2}O_2$ and $LiNi_{0.8}Mn_{0.1}Co_{0.1}O_2$.

In the case of forming a negative electrode (En) for a Lithium-ion secondary battery, the compound (EA) may preferably comprise a carbon-based material and/or a silicon-based material.

In some embodiments, the carbon-based material may be, for example, graphite, such as natural or artificial graphite, graphene, or carbon black.

These materials may be used alone or as a mixture of two or more thereof.

The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide. More particularly, the silicon-based compound may be silicon oxide or silicon carbide.

When present in compound (EA), the at least one silicon-based compound is comprised in the compound (EA) in an amount ranging from 1 to 50% by weight, preferably from 5 to 20% by weight with respect to the total weight of the compound (EA).

For the purpose of the present invention, the term "liquid medium [medium (L)]" is intended to denote a medium comprising one or more substances in the liquid state at 20° C. under atmospheric pressure.

The medium (L) is typically free from any solvent [solvent (S)].

Within the present invention, solvent (S) is intended to denote a solvent suitable for dissolving polymer (F) as defined above. To this aim, solvent (S) is typically selected from polar solvents, including N-methyl-2-pyrrolidone (NMP), N,N-dimethylformamide, N,N-dimethylacetamide, dimethylsulfoxide, hexamethylphosphamide, dioxane, tetrahydrofuran, tetramethylurea, triethyl phosphate, trimethyl phosphate; and mixtures thereof.

Said medium (L) is preferably selected from organic carbonates, ionic liquids (IL), or mixture thereof.

According to a first embodiment of the invention, said medium (L) comprises at least one organic carbonate as the only medium (L).

Non-limiting examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

According to a second embodiment of the invention, said medium (L) comprises at least one ionic liquid (IL) as the only medium (L).

By the term "ionic liquid (IL)", it is hereby intended to denote a compound formed by the combination of positively charged cations and negatively charged anions which exists in the liquid state at temperatures below 100° C. under atmospheric pressure.

The ionic liquid (IL) can be selected from protic ionic liquids ($IL_p$), aprotic ionic liquids ($IL_a$) and mixtures thereof.

By the term "protic ionic liquid ($IL_p$)", it is hereby intended to denote an ionic liquid wherein the cation comprises one or more H+ hydrogen ions.

Non-limitative examples of cations comprising one or more H+ hydrogen ions include, notably, imidazolium, pyridinium, pyrrolidinium or piperidinium rings, wherein the nitrogen atom carrying the positive charge is bound to a H+ hydrogen ion.

By the term "aprotic ionic liquid ($IL_a$)", it is hereby intended to denote an ionic liquid wherein the cation is free of H+ hydrogen ions.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

According to a third embodiment of the invention, said medium (L) comprises a mixture of at least one organic carbonate as defined above and at least one ionic liquid (IL) as defined above.

According to a preferred embodiment, said composition (C) further comprises at least one metal salt [salt (M)].

Said salt (M) is typically selected from the group consisting of: (a) MeI, Me(PF$_6$)$_n$, Me(BF$_4$)$_n$, Me(ClO$_4$)$_n$, Me(bis(oxalato)borate)$_n$ ("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(R$_F$SO$_2$)]$_n$, wherein R$_F$ is C$_2$F$_5$, C$_4$F$_9$ or CF$_3$OCF$_2$CF$_2$, Me(AsF$_6$)$_n$, Me[C(CF$_3$SO$_2$)$_3$]$_n$, Me$_2$Sn, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2,

(b)

wherein R'$_F$ is selected from the group consisting of F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_3$F$_5$OCF$_3$, C$_2$F$_4$OCF$_3$, C$_2$H$_2$F$_2$OCF$_3$ and CF$_2$OCF$_3$, and (c) combinations thereof.

Said salt (M) is advantageously dissolved by said medium (L).

On this regard, the concentration of said salt (M) in the medium (L) is advantageously at least 0.01 M, preferably at least 0.025 M, more preferably at least 0.05 M.

The concentration of the salt (M) in the medium (L) is advantageously at most 3 M, preferably at most 2 M, more preferably at most 1 M.

Advantageously, said composition (C) further comprises a conductive compound [compound (C)], which is able to impart electron conductivity to the electrode.

Examples thereof may include: carbonaceous materials, such as carbon black, graphite fine powder carbon nanotubes, graphene, or fiber, or fine powder or fibers of metals such as nickel or aluminum.

Said compound (C) is preferably selected from carbon black or graphite.

For sake of clarity, compound (C) is different from the carbon-based material described above for the negative electrode (En).

Preferably, said compound (C) is present in said composition (C) in an amount from 0.1 wt. % to 15 wt. %, more preferably from 0.25 to 12 wt. % based on the total weight of said composition (C).

Advantageously, said composition (C) further comprises at least one polymer [polymer (P)] comprising a backbone complying with the following formula:

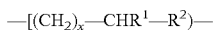

—[(CH$_2$)$_x$—CHR$^1$—R$^2$)— wherein
x is in integer from 1 to 3,
R$^1$ is hydrogen or methyl group; and
R$^2$ is oxygen atom or a group of formula —OC(=O)R$^3$ with R$^3$ being hydrogen atom or methyl.

Preferably, said polymer (P) has a melting point (Tm) lower than 120° C., more preferably lower than 100° C., even more preferably lower than 90° C.

Preferably, said polymer (P) has a melting point (Tm) higher than 25° C., more preferably higher than 30° C., even more preferably higher than 40° C.

Advantageously, when present, said polymer (P) is present in said composition (C) in an amount higher than 0.1 wt. %, preferably higher than 0.5 wt. % and more preferably higher than 1 wt. % based on the total weight of said composition (C).

Advantageously, said polymer (P) is present in said composition (C) in an amount lower than 20 wt. %, preferably lower than 10 wt. % and more preferably lower than 8 wt. % based on the total weight of said composition (C).

In a preferred embodiment, said polymer (P) is selected in the group comprising, preferably consisting of, polyalkylene oxide, such as notably polyethylene oxide (PEO), polypropylene oxide (PPO), polybutylene oxide; and poly(vinyl ester), such as poly (vinyl acetate).

In a preferred embodiment, composition (C) according to the present invention comprises:
    from 18 to 40.5 w. % of said medium (L) as defined above, optionally comprising at least one salt (M) as defined above;
    from 2 to 14 w. % of said polymer (F) as defined above;
    from 52 to 82 wt. % of said compound (EA) as defined above;
    from 0.5 to 10 wt. % of said compound (C); and
    optionally, from 3 to 5 wt. % of said polymer (P).

The layer (L1) of the electrode (E) of the invention typically has a thickness comprised between 10 μm and 500 μm, preferably between 50 μm and 250 μm, more preferably between 70 μm and 150 μm.

Preferably, under step (i), said substrate is selected from metal and non-metal substrates. More preferably, said substrate is selected from the group comprising, even more preferably consisting of: copper, aluminium, titanium, brass, silver, platinum; graphite; mixed metal oxide (MMO) electrodes having an oxide coating over an inert metal or carbon core.

Preferably, said step (iii) is performed by heating said composition (C) at a temperature higher than 100° C. until said polymer (F) is melted.

Advantageously, step (iii) is performed by heating said composition (C) at a temperature higher than 100° C. and preferably lower than 300° C., more preferably lower than 200° C., even more preferably lower than 170° C.

Advantageously, step (iv) is performed via a hot extruder, in other words an extruder capable of working at temperature higher than 100° C.

Indeed, as composition (C) comprises the medium (L) detailed above, it is possible to heat the composition (C) such that polymer (F) is in its melted form, and then extrude the same via hot extrusion step.

The Applicant indeed found that compositions that do not contain the medium (L) in the claimed range cannot be extruded via the hot extrusion step of the process of the present invention.

Composition (C) can be advantageously prepared by methods known to the person skilled in the art.

Composition (C) is preferably obtained in the form of paste.

According to another preferred embodiment, composition (C) of the invention is composition (C-1), which comprises:
    from 10 to 40 wt. % of said medium (L) as defined above, said medium (L) comprising at least one organic carbonate as the only medium (L);
    from 2 to 14 w. % of said polymer (F**-1) as defined above;
    from 52 to 82 wt. % of said compound (EA) as defined above;
    from 0.5 to 10 wt. % of said compound (C); and
    optionally, from 3 to 5 wt. % of said polymer (P).

Composition (C-1) according to this preferred embodiment can be advantageously extruded in the form of pellets, thereby providing pellets of said composition (C-1) suitable for use in the preparation of electrodes.

In a further aspect, the present invention thus relates to the use of said composition (C-1) in a process for the manufacture of an assembly, more preferably an electrode [electrode (E)], said process comprising:
(a) providing a substrate;
(b) providing composition (C-1) in the form of pellets, as defined above;
(c) heating said composition (C-1) at a temperature higher than 100° C.;
(d) extruding the composition (C-1) provided in step (b) onto the substrate provided in step (a), thereby providing an assembly comprising a substrate coated with at least one layer consisting of said composition (C-1).

In a fourth instance, the present invention pertains to an electrochemical device comprising the electrode (E) of the invention.

In particular, the present invention further pertains to a secondary battery comprising:
a positive electrode,
a negative electrode, and
between said positive electrode and said negative electrode, a membrane,
wherein at least one of the positive electrode and the negative electrode is the electrode (E) of the invention.

The present invention thus also pertains to a process for the manufacture of a secondary battery, said process comprising assembling a membrane between a positive electrode and a negative electrode, wherein at least one of the positive electrode and the negative electrode is the electrode (E) of the invention.

Advantageously, in said secondary battery, the positive electrode is the electrode (E) according to the present invention.

Advantageously, in said secondary battery, the negative electrode is the electrode (E) according to the present invention.

It will be apparent to the person skilled in the art that once the battery is assembled, medium (L) as defined above comprising salt (M) as defined above, can be further added to the secondary battery. Said medium (L) and said salt (M) being the same or different from medium (L) and salt (M) defined for composition (C) above.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The membrane typically comprises at least one material selected from inorganic materials and organic materials.

Non-limiting examples of suitable organic materials include, notably, polymers, said polymers being preferably selected from the group consisting of partially fluorinated fluoropolymers.

The membrane is advantageously free from one or more compounds (EA) as defined above.

Depending on the circumstances, the membrane may be a porous membrane comprising at least one medium (L) as defined above and at least one salt (M) as defined above. Said embodiment is also encompassed within the present invention.

When the membrane comprises said medium (L) and said salt (M), each of the medium (L) and the salt (M) can be the same or different from the medium (L) and the salt (M) as used in composition (C) according to the present invention.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXPERIMENTAL SECTION

Materials

Polymer ($F_1$**): VDF-AA (0.9% by moles)-HFP (2.4% by moles) polymer having an intrinsic viscosity of 0.28 L/g in DMF at 25° C. and Tm=148° C.

Polymer ($F_2$*): VDF-AA (0.9% by moles) polymer having an intrinsic viscosity of 0.30 L/g in DMF at 25° C. and Tm=162° C., obtained as described in WO 2008/129041.

Polymer ($F_1$**-1): VDF-AA (0.5% by moles)-HFP (6.5% by moles) polymer having an intrinsic viscosity of 0.32 L/g in DMF at 25° C. and Tm=127° C.

Polymer ($F_3$^): VDF-HFP (7% by moles) polymer having an intrinsic viscosity of 0.08 L/g in DMF at 25° C. and Tm=131° C.

Silicon/carbon (mixture of silicon and graphite) commercially available as BTR 480 from BTR with theoretical capacity was 480 mAh/g.

Carbon black was commercially available as Super® C45 and Super® C65. Graphite was commercially available as Actilon 2. Both from Imerys S.A.

LFP (lithium iron phosphate) was commercially available as Life Power® P2 from Phostech.

LiTFSI: bis(trifluoromethansulfonyl)imide lithium salt commercially available from Sigma Aldrich Pyr13TFSI: N-propyl-N-methylpyrrolidinium bis(trifluoromethanesulfonyl)imide commercially available from Solvionic Vinylene carbonate (VC) was commercially available from Sigma Aldrich.

Poly ethylene vinyl acetate (EVA) was commercially available as Greenflex® MQ 40, with MFI=12 g/10 min and Tm=83° C.

Poly(ethylene oxide) (PEO) was commercially available as Alkox® E60 with an average molecular weight between $1 \times 10^6$ and $1.2 \times 10^6$ Medium (L1): Pyr13TFSI
Medium (L2): ethylene carbonate (EC)/propylene carbonate (PC) 1/1 by volume Methods Determination of intrinsic viscosity of polymers ($F_1$**), ($F_2$*) and ($F_3$^)

Intrinsic viscosity (η) [dl/g] was measured using the following equation on the basis of dropping time, at 25° C., of a solution obtained by dissolving each of the polymers ($F_1$**), ($F_2$*), ($F_1$**-1) and ($F_3$^) in N,N-dimethylformamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for polymers ($F_1$**), ($F_2$*), ($F_1$**-1) and ($F_3$^) corresponds to 3.

DSC Analysis

DSC analyses were carried out according to ASTM D 3418 standard; the melting point (Tm) was determined at a heating rate of 10° C./min.

Preparation of the Electrodes

The ingredients in the amounts reported in the Tables below were mixed together so as to obtain for each mixture a paste.

Each paste thus obtained was introduced into the feeding hopper of a mini-extruder and melt blended using a co-rotating twin screw micro extruder DSM Xplore 15 ml Microcompounder. The micro extruder was formed by a divisible fluid tight mixing compartment containing two detachable, conical mixing screws. Residence time was recorded. The screw speed was fixed at 50 rpm for the mixing and sometimes higher during the exit of the extrudate. The heating temperature was set at 200° C. or 230° C. At the end of the mixing time the material was extruded through the nozzle. Immediately out of the nozzle, the extruded profile was laid on a copper film keep warm by a steel plate placed under it and preheated at 230° C. Using a little roller covered by a detaching adhesive, the extruded was manually pressed. The result was a strip which remains attached to the copper or aluminium film with a total thickness of about 500 um.

This sheet composed of several strips was placed in a compression molding machine heating at the temperatures detailed below, between two foils of PTFE. A pressure as detailed below was applied, thus obtaining an electrode (anode or cathode) having the thickness reported below.

Example A—Compositions for Preparing the Anodes

Each of the compositions of Example 1 and Example 2 was extruded at a temperature of 200° C. Residence time in the extruder was 5 minutes. RPM=50.

As the composition came out of the extruder, it was placed onto a copper metal collector and then pressed at 230° C. and 200 bars, thus obtaining a SiC electrode.

TABLE 1

| Ingredient | | Example 1 amounts | | Example 2 amounts | | Example 1C(*) Amounts | |
|---|---|---|---|---|---|---|---|
| | | g | Wt. % | g | Wt. % | g | Wt. % |
| Medium L-1 with 0.5M | | 6 | 23.1 | 5.1 | 22.2 | 2.2 | 9 |

TABLE 1-continued

| Ingredient | | Example 1 amounts | | Example 2 amounts | | Example 1C(*) Amounts | |
|---|---|---|---|---|---|---|---|
| | | g | Wt. % | g | Wt. % | g | Wt. % |
| of LiTFSI | | | | | | | |
| Binder | $F_1$** | 2 | 7.7 | 1.7 | 7.4 | 2.3 | 9.3 |
| Active material | BM480 BTR | 17.8 | 68.5 | 15.1 | 65.9 | 20.1 | 80.9 |
| Conductive carbon | SC45 | 0.2 | 0.7 | 0.2 | 0.7 | 0.2 | 0.8 |
| Polymer P | PEO | — | — | 0.9 | 3.8 | — | — |
| Thickness of the electrode | | 230 μm | | 200 μm | | n/p | |

(*) comparison
n/p = not performed

The adhesion was measured and the results are provided in Table 5.

The composition of Example 1C(*) of comparison contained an amount of medium (L-1) outside the claimed scope. This composition could not be extruded.

Example A1—Compositions for Preparing the Anodes

Each of the compositions of Example 1A and Example 2A was extruded at a temperature of 130° C. Residence time in the extruder was 5 minutes. RPM=50.

As the composition came out of the extruder, it was placed onto a copper metal collector and then pressed at 130° C. and 200 bars, thus obtaining a graphite electrode.

TABLE 1A

| Ingredient | | Example 1A amounts | | Example 2A amounts | |
|---|---|---|---|---|---|
| | | g | Wt. % | g | Wt. % |
| Medium L-2 with 10% wt of LiTFSI | | 3.42 | 18 | 5.36 | 25.5 |
| Binder | $F_1$**-1 | 1.9 | 10 | 1.91 | 9.1 |
| Active material | graphite | 13.49 | 71 | 13.55 | 64.5 |
| Conductive carbon | SC65 | 0.19 | 1 | 0.19 | 0.9 |
| Thickness of the electrode | | 95 μm | | 55 μm | |

The adhesion was measured and the results are provided in Table 5.

Example B—Composition for Preparing an LFP Cathode

The composition of Example 3 was extruded at a temperature of 230° C. Residence time in the extruder was 4 minutes. RPM=50. As the composition came out of the extruder, it was placed onto an aluminium metal collector and then pressed at 230° C. and 200 bars, thus obtaining a LFP electrode.

TABLE 2

| Ingredient | Example 3 amounts | |
|---|---|---|
| | g | Wt. % |
| Medium L-1 with 0.5 M of LiTFSI | 4.7 | 23.27 |

TABLE 2-continued

| Ingredient | | Example 3 amounts | |
|---|---|---|---|
| | | g | Wt. % |
| Binder | F$_1$** | 2.0 | 9.97 |
| Active material | LFP Phostec | 11.3 | 56.79 |
| Conductive carbon | SC45 | 2.0 | 9.97 |
| Thickness of the electrode | | | 160 μm |

The adhesion was measured and the results are provided in Table 5.

Example C—Compositions for Preparing the Anodes

Each of the compositions of Example 4, Example 5 and Example 6 was extruded at a temperature of 200° C. Residence time in the extruder was 5 minutes. RPM=50. As the compositions came out of the extruder, they were placed onto a copper metal collector and then pressed at 230° C. and 200 bars, thus obtaining a graphite electrode.

TABLE 3

| Ingredient | | Example 4 amounts | | Example 5 amounts | | Example 6 amounts | |
|---|---|---|---|---|---|---|---|
| | | g | Wt. % | g | Wt. % | g | Wt. % |
| Medium L-1 with 0.5M of LiTFI | | 10.41 | 40.1 | 3.6 | 18 | 3.6 | 18 |
| Binder | F$_1$** | 2.31 | 8.9 | — | — | — | — |
| | F$_2$* | — | — | 2.4 | 12 | 1.8 | 9 |
| Active material | Actilion 2 | 13.13 | 50.4 | 13.8 | 69 | 13.8 | 69 |
| Conductive carbon | SC65 | 0.144 | 0.6 | 0.2 | 1 | 0.2 | 1 |
| Polymer P | EVA | — | — | — | — | 0.6 | 3 |
| Thickness of the electrode | | 120 μm | | 220 μm | | 120 μm | |

The adhesion was measured and the results are provided in Table 5.

Example D—Compositions for Preparing the Anodes

The composition of Example 7 was extruded at a temperature of 140° C. Residence time in the extruder was 5 minutes. RPM=50. As the composition came out of the extruder, it was placed onto a copper metal collector and then pressed at 140° C. and 200 bars, thus obtaining a graphite electrode.

TABLE 4

| Ingredient | | Example 7 amounts | | Example 2C (*) amounts | |
|---|---|---|---|---|---|
| | | g | Wt. % | G | Wt. % |
| Medium L-2 with 1 M of LiTFI | | 3.6 | 18 | 0 | 0 |
| Binder | F$_3$^ | 2.4 | 12 | 2.4 | 14.1 |
| Active material | graphite | 13.8 | 69 | 13.8 | 81.2 |
| Conductive carbon | SC65 | 0.2 | 1 | 0.2 | 1.2 |

TABLE 4-continued

| Ingredient | | Example 7 amounts | | Example 2C (*) amounts | |
|---|---|---|---|---|---|
| | | g | Wt. % | G | Wt. % |
| Polymer P | EVA | — | — | 0.6 | 3.5 |
| Thickness of the electrode | | 200 μm | | n/p | |

(*) comparison
n/p = not performed

The composition of Example 2C(*) of comparison contained an amount of medium (L) outside the claimed scope. This composition could not be extruded.

Adhesion Test

The peeling tests were performed in order to evaluate the adhesion of the electrode composition coating onto the metal support. The test was performed on the electrodes prepared as described above, following the procedure of ASTM D903, working at a speed of 300 mm/min at 20° C.

A value higher than 10 N/m was considered acceptable and good performing for use in battery application.

TABLE 5

| Example | Substrate | Adhesion (N/m) |
|---|---|---|
| 1 | Copper | 100 |
| 2 | Copper | 98 |
| 1A | Copper | 90 |
| 2A | Copper | 106 |
| 3 | Aluminium | 49 |
| 4 | Copper | 28 |
| 5 | Copper | 45 |
| 6 | Copper | 88 |

All the electrodes prepared in accordance with the present invention showed adhesion values to current collector higher than the minimum required for battery applications.

Example E—Preparation of aBbattery

Two lithium coin cells (CR2032 type, diameter of 20 mm) were prepared in a glove box under an Ar gas atmosphere, by punching a small disk (diameter=12 mm) of the electrode prepared using the composition of Example 3, with lithium metal as a reference electrode.

The electrolyte used in the preparation of the coin cells was a standard 1M LiPF6 solution in EC/DMC in ratio 1/1, with 2 wt. % of VC additive.

Polyethylene separators (commercially available from Tonen Chemical Corporation) were used as received.

Capacity Retention Test

After initial charge and discharge cycles at a low current rate (formation phase), each of the two cells prepared as described in Example E were galvanostatically cycled at a constant current rate of C/5-D/5 with positive cut off of 4V and negative cut off of 2.5V.

The data obtained are reported in Table 6 below.

TABLE 6

| Loading (mAh/cm$^2$) | Coulombic efficiency at cycle 1 (%) | Initial capacity (mAh/g) | Retention after 25 cycles (% with respect to first cycle at C/5) |
|---|---|---|---|
| 4.05 | 98.2 | 155 | 98.8 |
| 3.74 | 98.0 | 142 | 99.4 |

Both cells showed very good coulombic efficiency, initial capacity and retention after 25 cycles.

The invention claimed is:

1. A composition [composition (C)] comprising:
   from 0.5 wt. % to less than 20 wt. % of at least one semi-crystalline partially fluorinated polymer [polymer (F)] comprising recurring units derived from 1,1-difluoroethylene (VDF) and recurring units derived from at least one hydrogenated monomer comprising at least one carboxylic acid end group [monomer (MA)];
   from 10 wt. % to less than 60 wt. % of at least one liquid medium [medium (L)] characterized by a boiling point equal to or higher than 150°° C., wherein said medium (L) is selected from the group consisting of organic carbonates, ionic liquids (IL), or combinations thereof; and
   at least 50 wt. % of at least one electro-active compound [compound (EA)];
   wherein the above amounts are based on the total weight of said composition (C), and wherein said polymer (F) is characterized by an intrinsic viscosity higher than 0.05 L/g, the intrinsic viscosity being measured from the dropping time of a solution of said polymer (F) at 25° C. at a concentration of 0.2 g/dl in N.N-dimethylformamide using a Ubbelhode viscosimeter, and
   wherein the composition (C) is free from any polar solvent [solvent(S)].

2. The composition (C) according to claim 1, wherein said polymer (F) comprises recurring units derived from 1,1-difluoroethylene (VDF), recurring units derived from at least one hydrogenated monomer comprising at least one carboxylic acid end group [monomer (MA)], and recurring units derived from at least one partially or fully fluorinated monomer [monomer ($F_{FH}$)], said monomer ($F_{FH}$) being different from VDF.

3. The composition (C) according to claim 2, wherein:
   said monomer (MA) complies with the following chemical formula (II):

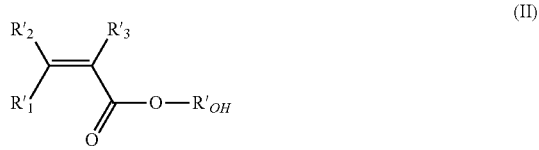

(II)

wherein:
$R'_1$, $R'_2$ and $R'_3$ are hydrogen atoms, and
$R'_{OH}$ is a hydrogen atom or a $C_1$-$C_5$ hydrocarbon moiety comprising at least one hydroxyl group;
and said monomer ($F_{FH}$) is selected from the group comprising:
—$C_2$-$C_8$ perfluoroolefins;
—$C_2$-$C_8$ hydrogenated fluoroolefins different from VDF;
—$CH_2$=CH—$R_{f0}$, wherein $R_{f0}$ is a $C_1$-$C_6$ perfluoroalkyl;
chloro- and/or bromo- and/or iodo-$C_2$-$C_6$ fluoroolefins;
—$CF_2$=CFOX$_0$, wherein X$_0$ is a $C_1$-$C_6$ fluoro-or perfluoroalkyl; a $C_1$-$C_{12}$ alkyl group, a $C_1$-$C_{12}$ oxyalkyl group or a $C_1$-$C_{12}$ (per) fluorooxyalkyl group having one or more ether groups; group -$CF_2OR_{f2}$ wherein $R_{f2}$ is a $C_1$-$C_6$ fluoro-or perfluoroalkyl group or a $C_1$-$C_6$ (per) fluorooxylalkyl group having one or more ether groups;
—$CF_2$=CFOY$_0$,
wherein Y$_0$ is a $C_1$-$C_{12}$ alkyl group or (per) fluoroalkyl group, a $C_1$-$C_{12}$ oxyalkyl group or a $C_1$-$C_{12}$ (per) fluorooxyalkyl group having one or more ether groups, or a carboxylic or sulfonic acid group, in its acid, acid halide or salt form; or
fluorodioxoles.

4. The composition (C) according to claim 1, wherein said polymer (F) comprises:
   recurring units derived from VDF and recurring units derived from at least one monomer (MA) [polymer (F*)]; or
   recurring units derived from VDF, recurring units derived from at least one monomer (MA), and recurring units derived from at least one monomer ($F_{FH}$) [polymer (F**)].

5. The composition (C) according to claim 4, wherein:
   said polymer (F*) comprises:
   at least 90% by moles of recurring units derived from VDF,
   from 0.05% to 10% by moles of recurring units derived from at least one monomer (MA); and
   said polymer (F**) comprises:
   at least 80% by moles of recurring units derived from VDF,
   from 0.01% to 10% by moles of recurring units derived from at least one monomer (MA), and
   from 0.1% to 15% by moles of at least one monomer ($F_{FH}$).

6. The composition (C) according to claim 1, wherein said composition (C) comprises a conductive compound [compound (C)].

7. The composition (C) according to claim 6, wherein said compound (C) is present in said composition (C) in an amount from 0.1 wt. % to 15 wt. % based on the total weight of said composition (C).

8. The composition (C) according to claim 1, wherein said composition (C) comprises a polymer [polymer (P)] comprising a backbone complying with the following formula:
   —[($CH_2$)$_x$-CHR$^1$-R$^2$]—
   wherein
   x is an integer from 1 to 3,
   R$^1$ is a hydrogen or methyl group; and
   R$^2$ is an oxygen atom or a group of formula —OC(=O)R$^3$, with R$^3$ being a hydrogen atom or a methyl group, and
   wherein said polymer (P) has a melting point (Tm) higher than 25° C. and lower than 120° C.

9. The composition (C) according to claim 8, wherein said polymer (P) is present in said composition (C) in an amount higher than 0.1 wt. % and lower than 20 wt. %, based on the total weight of said composition (C).

10. The composition (C) according to claim 1, said composition (C) comprising:
    from 18 to 40.5 wt. % of said medium (L), optionally comprising at least one salt (M);
    from 2 to 14 wt. % of said polymer (F);
    from 52 to 82 wt. % of said compound (EA);
    from 0.5 to 10 wt. % of a conductive compound [compound (C)]; and optionally, from 3 to 5 wt. % of a polymer [polymer (P)] comprising a backbone complying with the following formula:

—[(CH$_2$)$_x$-CHR$^1$-R$^2$]— wherein x is an integer from 1 to 3,

R$^1$ is a hydrogen or methyl group; and

R$^2$ is an oxygen atom or a group of formula —OC(=O)R$^3$, with R$^3$ being a hydrogen atom or methyl group, and wherein said polymer (P) has a melting point (Tm) higher than 25° C. and lower than 120° C.

11. The composition (C) according to claim 1, said composition (C) comprising:

from 10 to 40 wt. % of said medium (L), said medium (L) comprising at least one organic carbonate as the only medium (L);

from 2 to 14 wt. % of polymer (F-1), wherein polymer (F-1) comprises:

at least 80% by moles of recurring units derived from VDF, from 0.01% to 10% by moles of recurring units derived from at least one monomer (MA), and from 5% to 12% by moles of at least one monomer (FFH);

from 52 to 82 wt. % of said compound (EA);

from 0.5 to 10 wt. % of a conductive compound [compound (C)]; and optionally, from 3 to 5 wt. % of a polymer [polymer (P)] comprising a backbone complying with the following formula:

—[(CH$_2$)$_x$-CHR$^1$-R$^2$]— wherein x is an integer from 1 to 3,

R$^1$ is a hydrogen or methyl group; and

R$^2$ is an oxygen atom or a group of formula —OC(=O)R$^3$, with R$^3$ being a hydrogen atom or methyl group, and wherein said polymer (P) has a melting point (Tm) higher than 25° C. and lower than 120° C.

12. A process for the manufacture of an assembly, said process comprising:

(a) providing a substrate;

(b) providing composition (C) as defined in claim 11 in the form of pellets;

(c) heating said composition (C) at a temperature higher than 100° C.;

(d) extruding the composition (C) provided in step (b) onto the substrate provided in step (a), thereby providing an assembly comprising a substrate coated with at least one layer consisting of said composition (C).

13. An assembly comprising:

at least one substrate, and directly adhered onto said substrate, at least one layer [layer (L1)] consisting of composition (C) of claim 1, wherein said assembly is a positive electrode or a negative electrode.

14. A secondary battery comprising:

a positive electrode, a negative electrode, and a membrane interposed between said positive electrode and said negative electrode, wherein at least one of said positive electrode and said negative electrode is the assembly according to claim 13.

15. A process for the manufacture of an assembly, said process comprising:

(i) providing a substrate;

(ii) providing composition (C) comprising:

from 0.5 wt. % to less than 20 wt. % of at least one semi-crystalline partially fluorinated polymer [polymer (F)] comprising recurring units derived from 1,1-difluoroethylene (VDF);

from 10 wt. % to less than 60 wt. % of at least one liquid medium [medium (L)] characterized by a boiling point equal to or higher than 150° C., wherein said medium (L) is selected from the group consisting of organic carbonates, ionic liquids (IL), or combinations;

at least 50 wt. % of at least one electro-active compound [compound (EA)];

wherein the above amounts are based on the total weight of said composition (C), and wherein said polymer (F) is characterized by an intrinsic viscosity higher than 0.05 L/g, the intrinsic viscosity being measured from the dropping time of a solution of said polymer (F) at 25° C. at a concentration of 0.2 g/dL in N.N-dimethylformamide using a Ubbelhode viscosimeter; and wherein the composition (C) is free from any polar solvent [solvent(S)];

(iii) heating said composition (C) at a temperature higher than 100° C.;

(iv) extruding the composition (C) provided in step (ii) onto the substrate provided in step (i), thereby providing an assembly comprising a substrate coated with at least one layer consisting of said composition (C).

* * * * *